United States Patent
Cohen et al.

(10) Patent No.: US 9,934,302 B1
(45) Date of Patent: Apr. 3, 2018

(54) METHOD AND SYSTEM FOR PERFORMING REPLICATION TO A DEVICE WHILE ALLOWING APPLICATION ACCESS

(71) Applicant: EMC Corporation, Hopkinton, MA (US)

(72) Inventors: Saar Cohen, Moshav (IL); Assaf Natanzon, Tel Aviv (IL); Valerie Lotosh, Ramat-Gan (IL); Roman Zendel, Nataya (IL); Ido Halevi, Givat Ada (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 577 days.

(21) Appl. No.: 14/502,250

(22) Filed: Sep. 30, 2014

(51) Int. Cl.
G06F 17/30 (2006.01)

(52) U.S. Cl.
CPC .. G06F 17/30575 (2013.01); G06F 17/30578 (2013.01)

(58) Field of Classification Search
CPC ......... G06F 17/30206; G06F 17/30088; G06F 17/30578; G06F 17/30581; G06F 17/30215
See application file for complete search history.

(56) References Cited

U.S. PATENT DOCUMENTS

| 8,335,771 | B1* | 12/2012 | Natanzon | G06F 17/30008 707/684 |
|---|---|---|---|---|
| 2007/0233704 | A1* | 10/2007 | Shiga | H04L 67/1095 |
| 2008/0183973 | A1* | 7/2008 | Aguilera | G06F 11/1464 711/147 |
| 2011/0099342 | A1* | 4/2011 | Ozdemir | G06F 11/2066 711/162 |

OTHER PUBLICATIONS

Guy, Richard, et al. "Rumor: Mobile data access through optimistic peer-to-peer replication." Advances in Database Technologies. Springer, Berlin, Heidelberg, 1999. 254-265.*
Rabinovich, Michael, et al. "A dynamic object replication and migration protocol for an internet hosting service." Distributed Computing Systems, 1999. Proceedings. 19th IEEE International Conference on. IEEE, 1999.*
Amjad, Tehmina, Muhammad Sher, and Ali Daud. "A survey of dynamic replication strategies for improving data availability in data grids." Future Generation Computer Systems 28.2 (2012): 337-349.*

* cited by examiner

*Primary Examiner* — Nan Hutton
(74) *Attorney, Agent, or Firm* — Krishnendu Gupta

(57) ABSTRACT

Example embodiments of the present invention relate to a method, a system, and a computer program product for enabling concurrent host access at a replica site to a point in time different than a current point in time of a replication environment. The method includes performing data protection from a production site to a replica site in a replication environment and enabling concurrent host access at the replica site to a point in time different than a current point in time of the replication environment.

11 Claims, 13 Drawing Sheets

SNAPSHOT OPERATIONS
CREATE SNAPSHOT
REFRESH SNAPSHOT FROM DEVICE

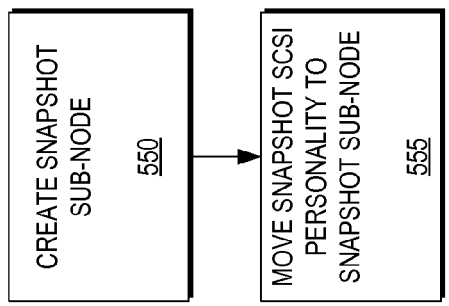
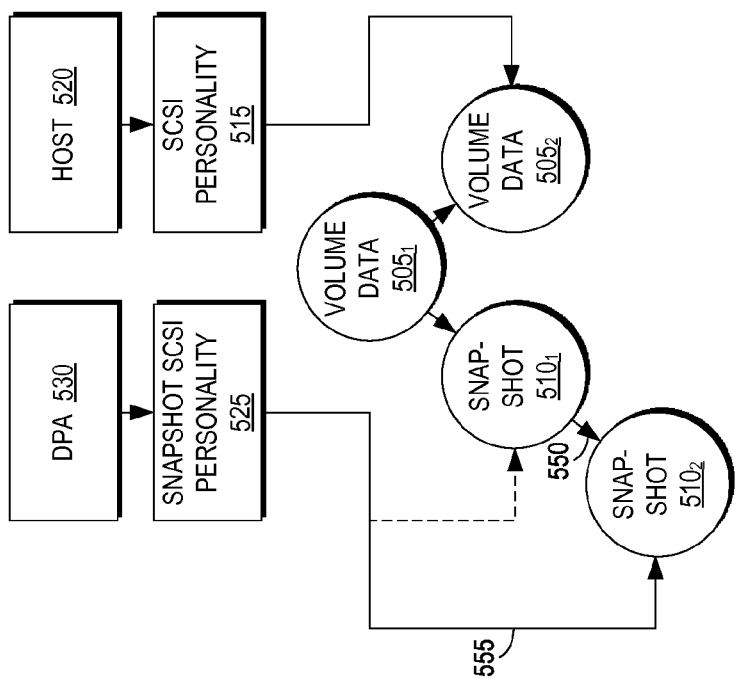

SNAPSHOT OPERATIONS
PROMOTE SNAPSHOT
SNAPSHOT AND REASSIGN

SNAPSHOT OPERATIONS
DIFFERENCE SNAPSHOTS
DIFFERENCES BETWEEN SNAPSHOTS

REPLICATION OPERATIONS
PRODUCTION SITE

REPLICATION OPERATIONS
DISTRIBUTION – REPLICA SITE

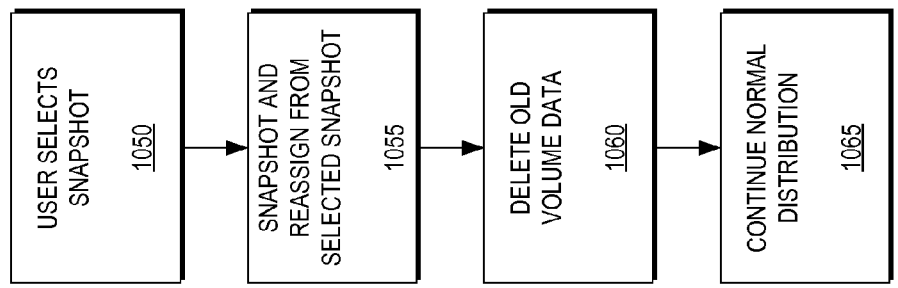
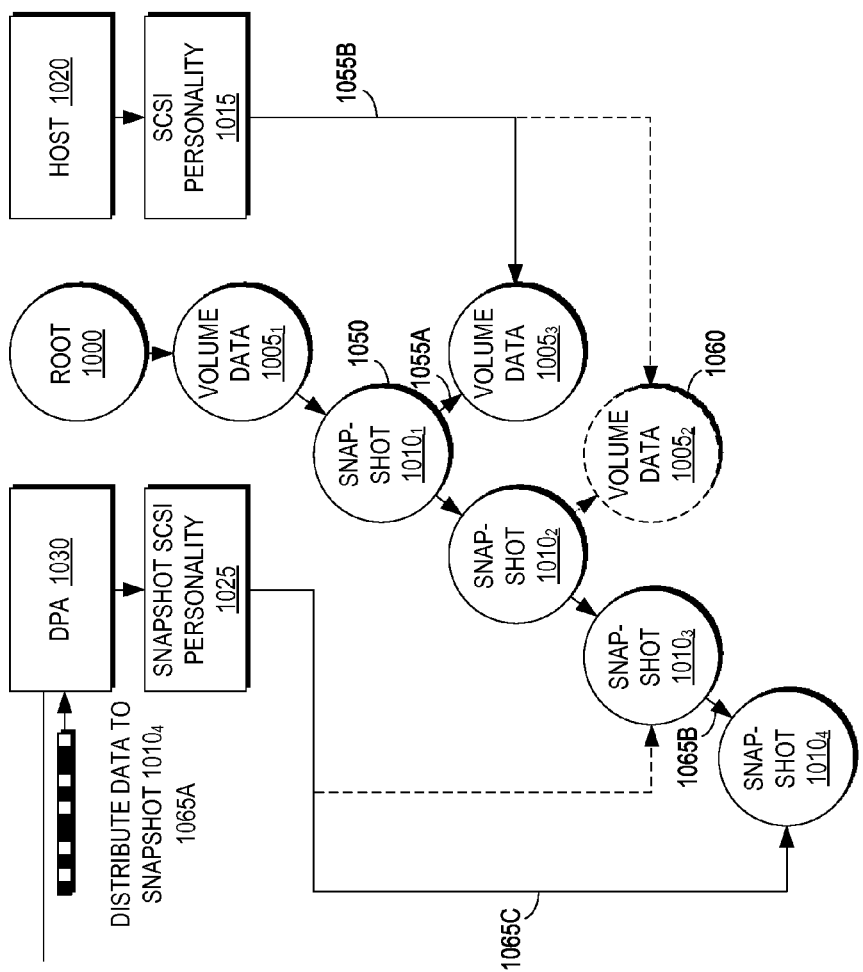

REPLICATION OPERATIONS
FAILOVER

METHOD AND SYSTEM FOR PERFORMING REPLICATION TO A DEVICE WHILE ALLOWING APPLICATION ACCESS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention relate to a method, a system, and a computer program product for enabling concurrent host access at a replica site to a point in time different than a current point in time of a replication environment. The method includes performing data protection from a production site to a replica site in a replication environment and enabling concurrent host access at the replica site to a point in time different than a current point in time of the replication environment.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 5A and 5B are a block diagram and a flow diagram, respectively, of a snapshot operation to create a snapshot from a snapshot according to an example embodiment of the present invention;

FIGS. 10A and 10B are a block diagram and a flow diagram, respectively, of a replication operation for performing image access at the replica site according to an example embodiment of the present invention;

DETAILED DESCRIPTION

Figure 1:
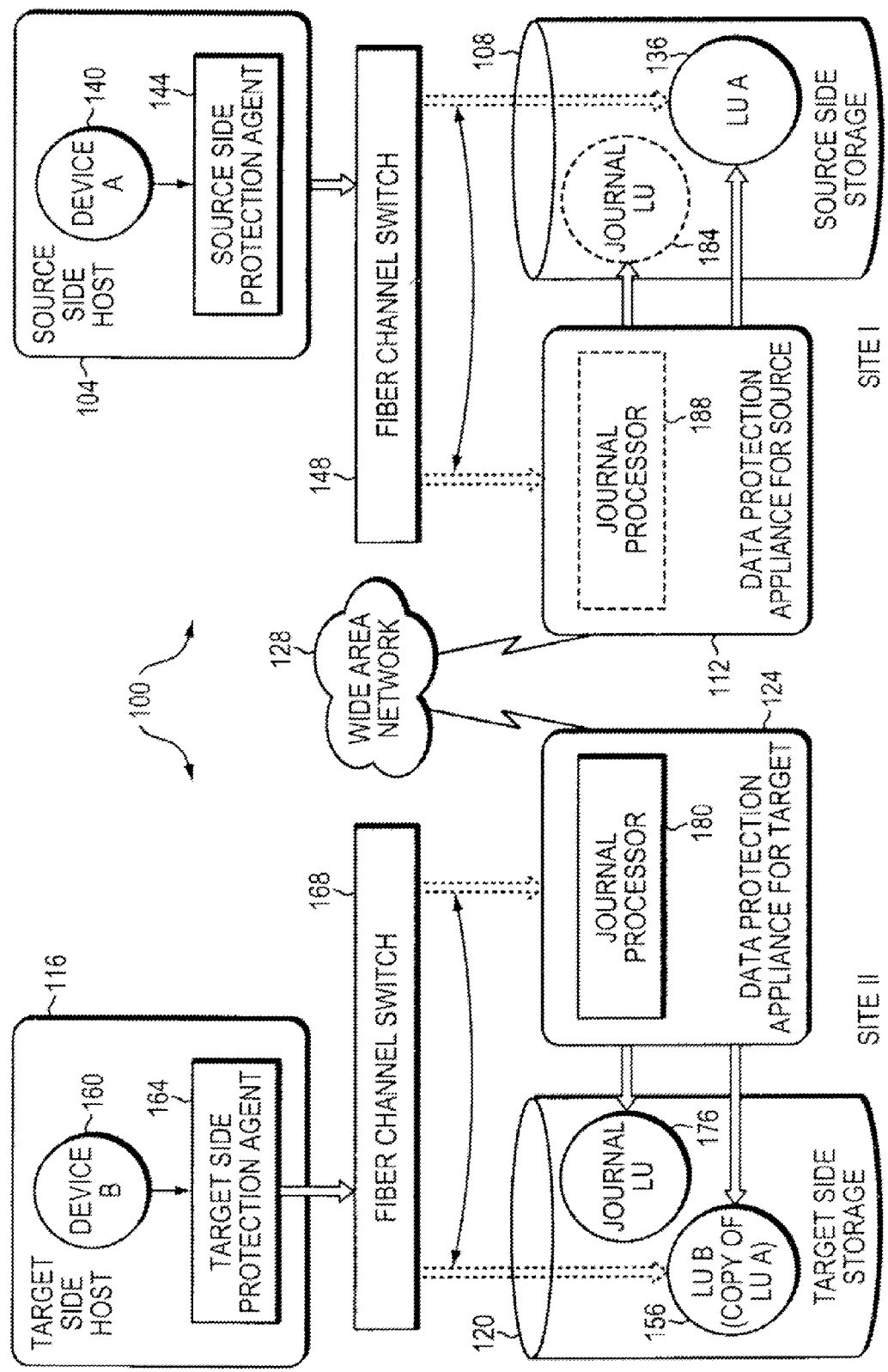
FIG. 1 is a block diagram of a data protection system according to an example embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running either on a production host a switch or a storage array which can intercept IO and split them to a DPA and to the storage array, fail IO redirect IO or do any other manipulation to the IO;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches.

The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
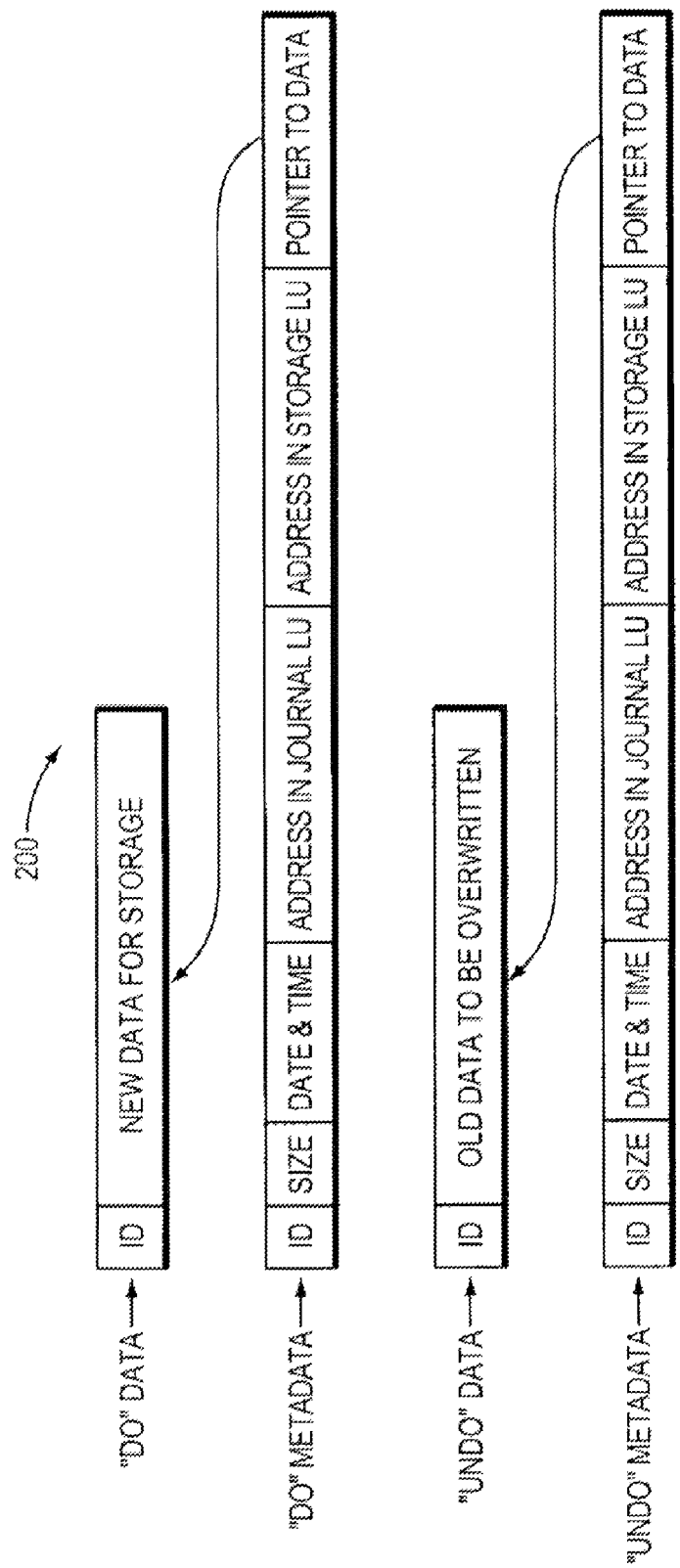
FIG. 2 is a block diagram of a write transaction for a journal according to an example embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC® PowerPath™), through an intelligent fabric switch, through array-based splitter, such as EMC CLARiiON®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, MA and are hereby incorporated by reference in their entirety.

Performing Replication to a Device While Allowing Application Access

In a continuous data protection (CDP) configuration there is typically a compromise between (1) the replication engine's (e.g., data protection appliance (DPA)) ability to continue replicating I/Os and to maintain a minimal lag on the replica copy, and (2) an application's capability to access the replicated data on the same copy.

For example, in EMC RecoverPoint® by EMC Corporation of Hopkinton, Mass., when a user chooses to test a snapshot image by accessing a point-in-time image of the data, actual replication may not be able to continue. Although RecoverPoint will continue to send data changes to the replica site, these will not be applied to the actual device. Therefore, during image-access periods, the recovery time objective (RTO) will increase (i.e., if the user chooses to access the latest image, RecoverPoint will need to apply all the changes that accumulated during the image-access period and apply them to the replica copy, which may take a considerable amount of time depending on the incoming data rate and the length of the image-access period).

Example embodiments of the present invention overcome these and other deficiencies by utilizing an array-snapshot mechanism and replication engine interaction and may be beneficial in data protection (e.g., by RecoverPoint) with EMC® XtremIO® storage arrays serving as replica storage to which RecoverPoint is replicating data. Accordingly, example embodiments of the present invention perform data protection from a production site to a replica site in a replication environment and enable concurrent host access at the replica site to a point in time different than a current point in time of the replication environment. Example embodiments of the present invention allow a user to access a target device at a point in time using a SCSI identity of the volume at the target. Therefore, example embodiments of the present invention replicate to a "shadow" device (i.e., a snapshot). Although traditional replication systems allow image access, replicated I/Os are journaled in the journal; however, in example embodiments of the present invention, I/Os are actually replicated to the target volume while allowing user access to the target volume via the snapshot.

Figure 3:
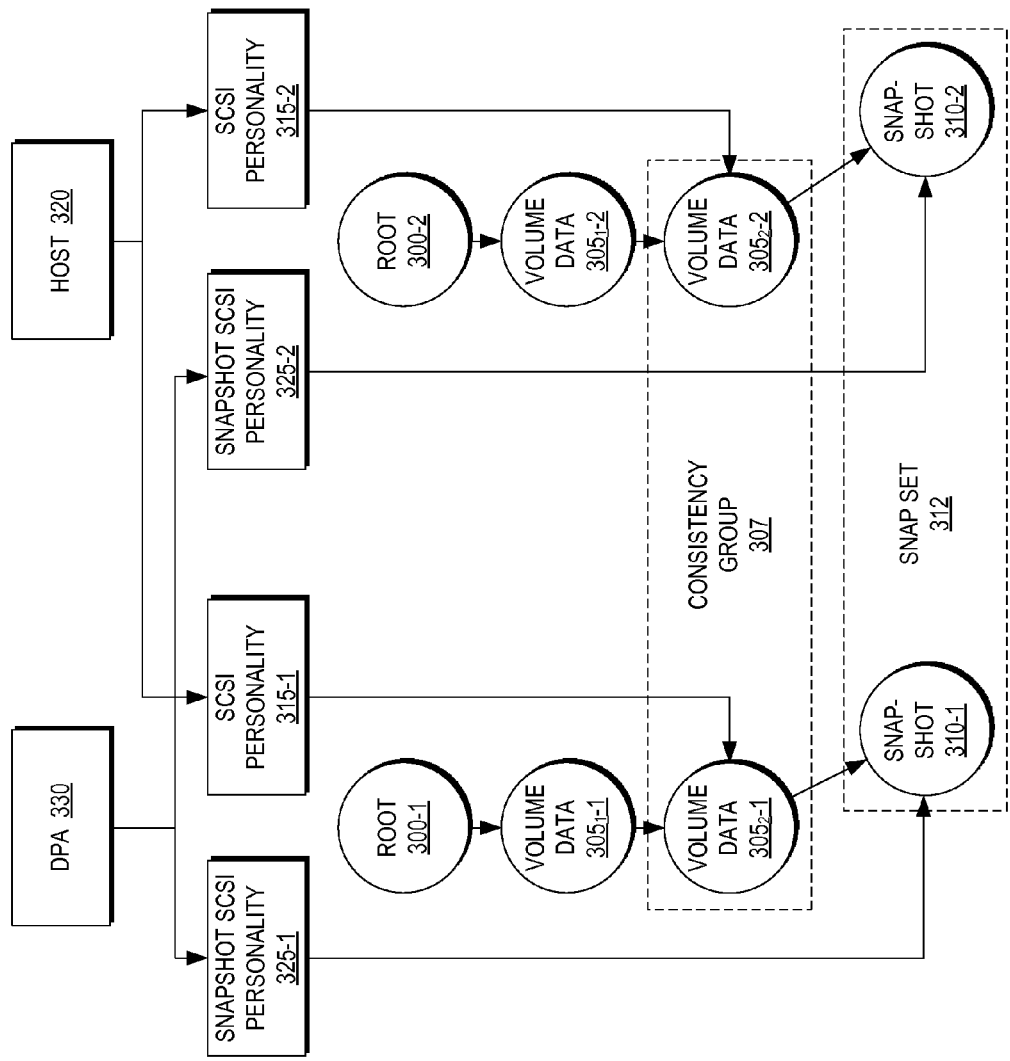
FIG. 3 is a block diagram of a plurality of volumes maintained at a replica site represented as respective trees of nodes according to an example embodiment of the present invention.

FIG. 3 is a block diagram of a plurality of volumes maintained at a replica site represented as respective trees of nodes according to an example embodiment of the present invention. As illustrated in FIG. 3, a replica site may include a data protection appliance (DPA) 330 and a host 320. FIG. 3 illustrates two replication target volumes may be represented as a series of nodes each having an empty root node 300-1, 300-2 (300 generally), a first volume data node $305_1$-1, $305_1$-2 ($305_1$ generally) frozen in time, a second volume data node $305_2$-1, $305_2$-2 ($305_2$ generally) containing volume changes from the first volume data node $305_1$, and a snapshot node 310-1, 310-2 (310 generally). The volume data is represented as a tree of nodes, each containing the differences from its parent. When creating a snapshot, a new node is created that is initially empty.

The host 320 may access the volume data nodes 305-1, 305-2 according respective SCSI personalities 315-1, 315-2 (315 generally) visible to the host 320 and linked to a current volume data node 305 to enable access to a point in time different than a current point in time being replicated. The DPA 330 may make replicated changes to the snapshot nodes 310-1, 310-2 according to respective snapshot SCSI personalities 325-1, 325-2 (325 generally) visible to the DPA 330 and linked to a current snapshot node 310 to enable the DPA 330 to perform replication of changes received from the production site. SCSI personalities 315 and snapshot SCSI personalities may be moved to other respective types of nodes in the tree and will be described in greater detail below.

The volume data nodes 305 may belong to a consistency group 307 and the snapshot nodes 310 may belong to a snap set 312, which is a set of snapshots taken on a consistency group. For simplicity, the following description will describe only one replication target volume; however, it should be understood that the methods described herein are equally as applicable to replication environments replicating a plurality of volumes in a consistency group spanning several volumes, as shown in FIG. 3, by assuring that snapshot operations are performed atomically over that group of volumes.

In other words, as will be described in greater detail below, the replication site storage maintains a tree of volumes 305 and snapshots 310, where every node in the tree represents the differences between that node and the node's parent. The DPA 330 maintains a tree-branch of snapshots that represent the hierarchy of point-in-time images for the device. When a user chooses to access a given point-in-time, as will be described below with respect to FIGS. 6A and 6B, a "snap and reassign" operation is performed on the selected snapshot and the application host can now access the device. At the same time, the DPA 330 continues to apply new changes to the latest snapshot of the device (i.e., the current leaf of the snapshots branch) and generates new snapshots when required. In this manner, the host 320 continues to access the device 305 while at the same time the replication continues and RTO becomes minimal. If an emergency requires that the latest image be exposed, all that is needed is to perform the snap and reassign operation for the latest snapshot image generated.

Figure 6B:
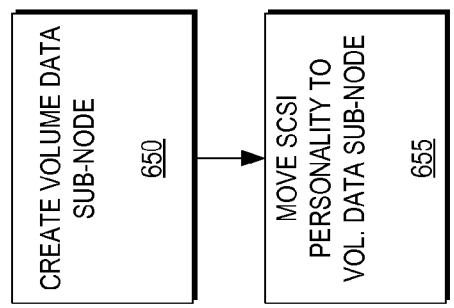
FIGS. 6A and 6B are a block diagram and a flow diagram, respectively, of a snapshot operation to promote a snapshot and take a snapshot and reassign the SCSI personality according to an example embodiment of the present invention.
Figure 6A:
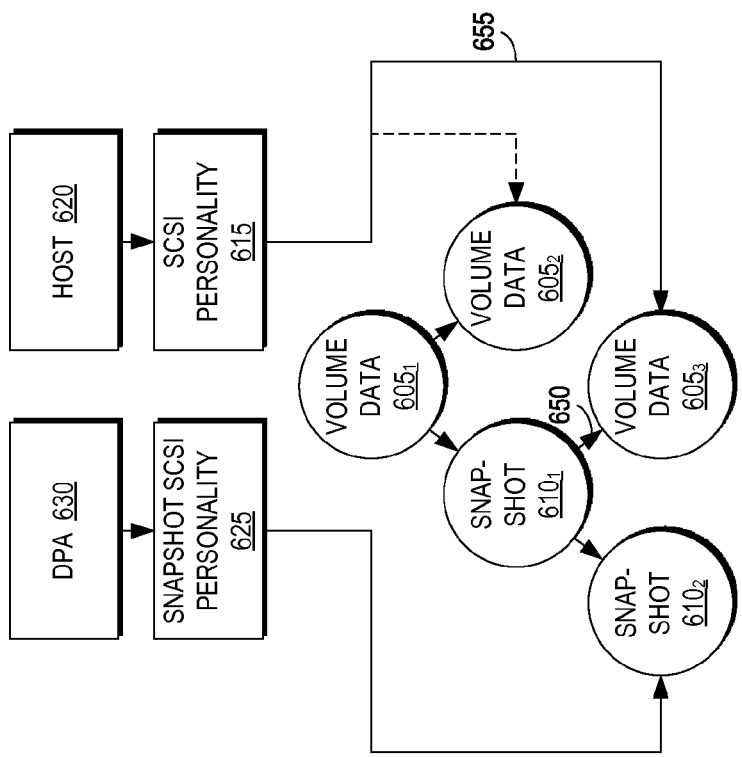
Figure 7:
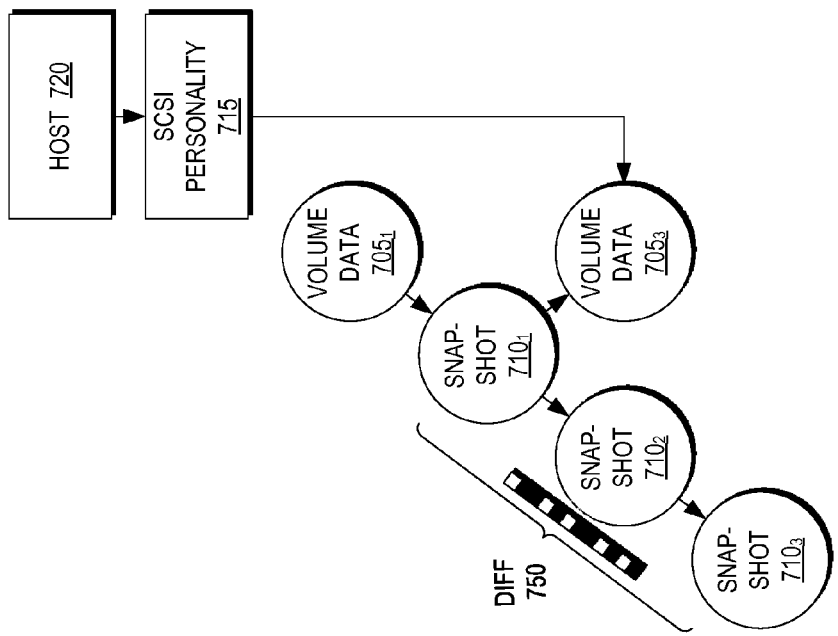
FIG. 7 is a block diagram of a snapshot operation for determining a difference between two snapshots according to an example embodiment of the present invention.

FIGS. 4A-7 are block diagrams and flow diagrams of snapshot operations according to example embodiments of the present invention, respectively. Snapshot operations may include (1) create a snapshot (refresh snapshot from device) (FIGS. 4A and 4B), (2) create a snapshot (refresh snapshot from snapshot) (FIGS. 5A and 5B), (3) promote snapshot (snapshot and reassign) (FIGS. 6A and 6B), and (4) difference between snapshots (FIG. 7).

Figure 4B:
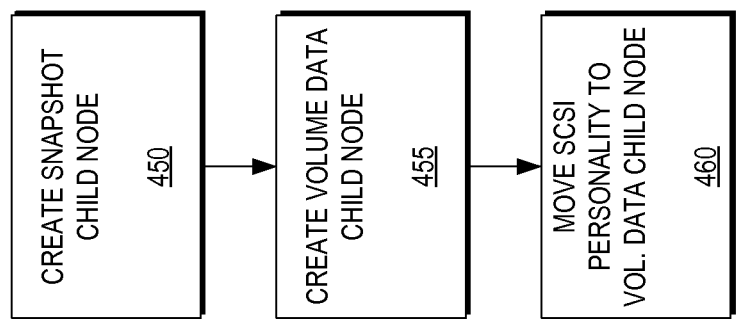
FIGS. 4A and 4B are a block diagram and a flow diagram, respectively, of a snapshot operation to create a snapshot from a volume device according to an example embodiment of the present invention.
Figure 4A:
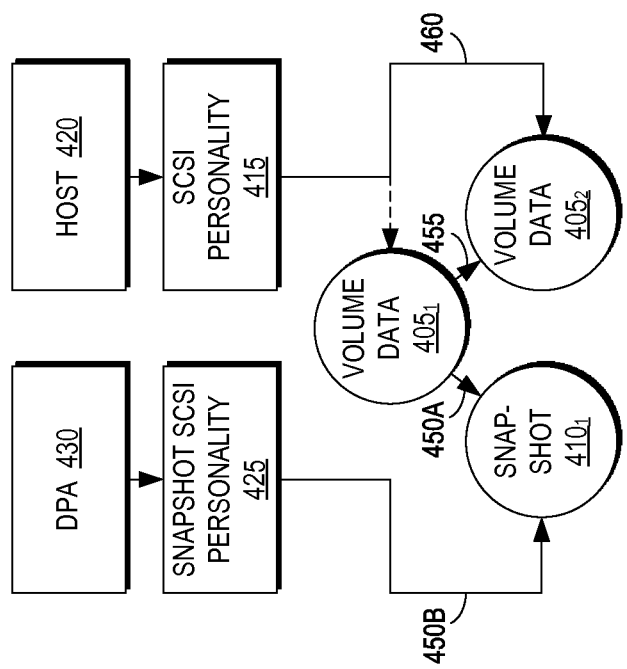

FIGS. 4A and 4B are a block diagram and a flow diagram, respectively, of a snapshot operation to create a snapshot from a volume device according to an example embodiment of the present invention and may be described in conjunction. In an initial state, there is a volume data node $405_1$ with the SCSI personality 415 pointing to the volume data node $405_1$. As illustrated in FIGS. 4A and 4B, the production site storage may create a first snapshot node $410_1$ from the volume data node $405_1$ (450A) (450) and assign the snapshot SCSI personality 425 to the snapshot $410_1$ (450B). The production site storage then may create a second volume data node $405_2$ from the volume data node $405_2$ (455) and move the SCSI personality from the parent volume data node $405_1$ to the second volume data node $405_2$.

Accordingly, when the production site storage creates a snapshot $410_1$ of the volume data $405_1$ (i.e., device), there are two entities created: (1) a snapshot $410_1$ which is a version of the volume data $405_1$ (i.e., a writable snapshot that points to the volume), and (2) a volume data node $405_2$ which is assigned the SCSI personality 415. Therefore, the second volume data node $405_2$ can get new changes to the volume $405_1$ which now becomes fixed (i.e., when a snapshot is taken, the volume two new volume are created and the original becomes fixed with no more changes). It should be understood that, the parent volume data node $405_1$ is the same as the data in the snapshot $410_1$ before any I/O operations are performed on it. The second volume data node $405_2$ is assigned the SCSI personality so it receives the I/Os from the host 420. Therefore, the host 420 may perform I/O operations to the second volume data node $405_2$ and replicated I/Os from the DPA 430 may be performed on the snapshot $410_1$.

FIGS. 5A and 5B are a block diagram and a flow diagram, respectively, of a snapshot operation to create a snapshot from a snapshot according to an example embodiment of the present invention and may be described in conjunction. In an initial state, there is a first volume data node $505_1$ having two child nodes: a first snapshot node $510_1$ with the snapshot SCSI personality 525 pointing to the first snapshot node $510_1$ and a second volume data node $505_2$ with the SCSI personality 515 pointing to the second volume data node $505_2$ (similar to the arrangement of nodes created in FIGS. 4A and 4B above). As illustrated in FIGS. 5A and 5B, the replica site storage may create a second snapshot node $510_2$ of the first snapshot node $510_1$ (550) and move the SCSI snapshot personality 525 from the first snapshot node $510_1$ to the second snapshot node $510_2$ (555). Therefore, the first snapshot node $510_1$ is frozen at the time of the creation of the second snapshot node $510_2$ and the snapshot SCSI personality 525 move to the second snapshot node $510_2$ for performing replication operations, as will be described in greater detail below.

FIGS. 6A and 6B are a block diagram and a flow diagram, respectively, of a snapshot operation to promote a snapshot and take a snapshot and reassign the SCSI personality according to an example embodiment of the present invention and may be described in conjunction. In an initial state, there is a first volume data node $605_1$ having two child nodes, a first snapshot node $610_1$ and a second volume data node $605_2$ having the SCSI personality 615 pointing to the second volume data node $605_2$, with the first snapshot node $610_1$ having a second snapshot node $610_2$ with the snapshot SCSI personality 625 pointing to the second snapshot node $610_2$ (similar to the arrangement of nodes created in FIGS. 5A and 5B above). As illustrated in FIGS. 6A and 6B, the DPA 630 creates a third volume data node $605_3$ as a child node of the first snapshot node $610_1$ (650) and moves the SCSI personality 615 from the second volume data node $605_2$ to the third volume data node $605_3$ (655). Therefore, the DPA 630 may continue to perform replication operations to the second snapshot node $610_2$ and the host may access the point in time represented by the first snapshot node $610_1$ via the third volume data node $605_3$. In a preferred embodiment, the third volume data node $605_3$ is empty and points to the frozen data in the first snapshot node $610_1$. Accordingly, the third volume data node $605_3$ has the SCSI personality 615 of the target device in the replication and the replica may continue to be updated by updating the snapshot node assigned snapshot SCSI personality 625 (here the second snapshot node $610_2$).

FIG. 7 is a block diagram of a snapshot operation for determining a difference between two snapshots according to an example embodiment of the present invention. For example, at a production site in a replication environment, the difference between two snapshots may be taken to produce a bitmap of the changes between two snap sets, and that difference may be shipped to the replica site. As illustrated in FIG. 7, a difference 750 may be taken between a first snapshot node $710_1$ and a third snapshot node $710_3$. It should be understood that a difference may be taken with a root node $705_1$ of a device, in which case the entire volume is returned.

FIGS. 8A-11B are block diagram and flow diagrams, respectively, of replication operations according to an example embodiment of the present invention, including replication operations performed at a production site, and performing replication operations perform in distribution, image access, and failover at a replica site.

Figure 8B:
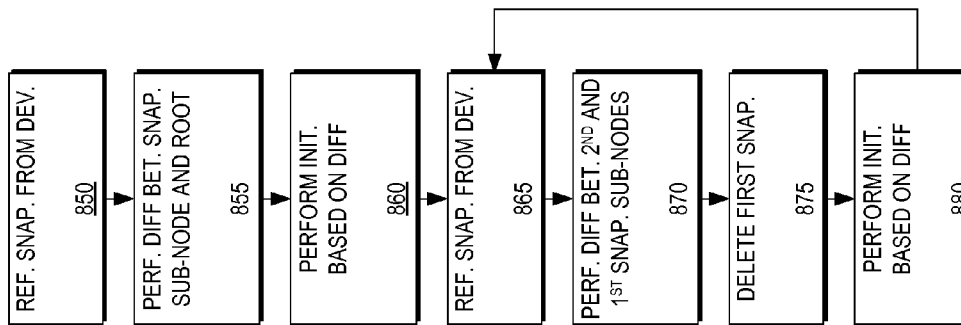
FIGS. 8A and 8B are a block diagram and a flow diagram, respectively, of a replication operation performed at a production site according to an example embodiment of the present invention.
Figure 8A:
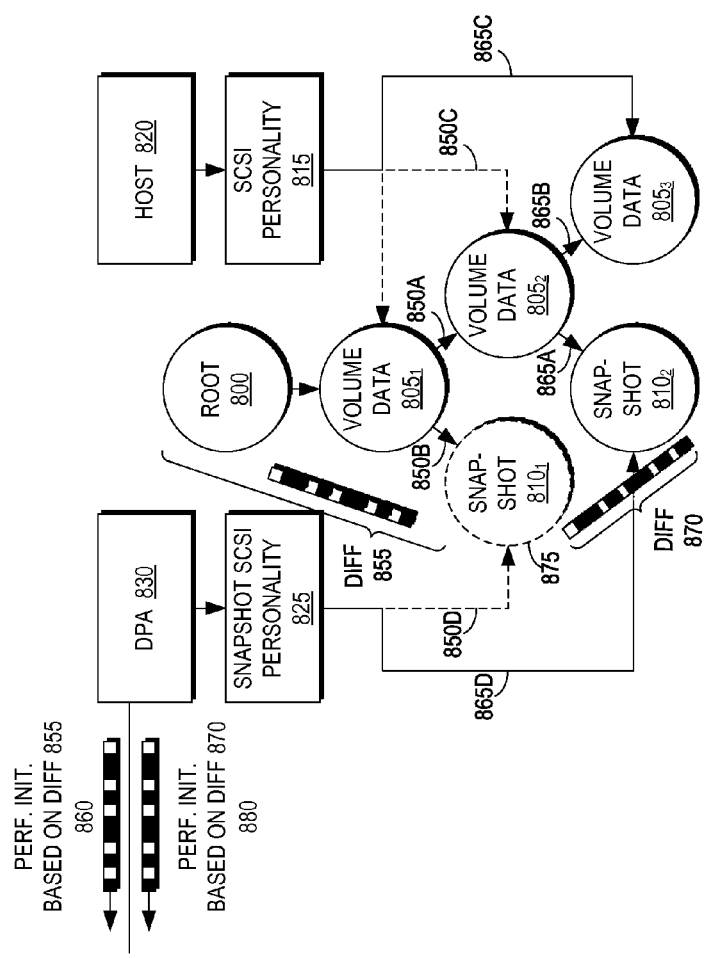

FIGS. 8A and 8B are a block diagram and a flow diagram, respectively, of a replication operation performed at a production site according to an example embodiment of the present invention and may be described in conjunction. As illustrated in FIG. 8A, at an initial time, the production site may include a host 820 maintaining a SCSI personality 815 to a first volume data node $805_1$. As illustrated in FIGS. 8A and 8B, when replication in the replication environment is commenced, the production site storage may perform a "refresh snapshot from device" operation (as described above with reference to FIGS. 4A and 4B) on the first volume data node $805_1$ (850), creating a second volume data node $805_2$ (850A) and a first snapshot node $810_1$ (850B) and causing the SCSI personality 815 to be reassigned from the first volume data node $805_1$ to the second volume data node $805_2$ (850C) and the snapshot SCSI personality 825 to be assigned to the first snapshot node $810_1$ (850D). The first snapshot node $810_1$ represents the point in time to be shipped to the replica site. The production site storage then determines the difference 855 between the first snapshot node $810_1$ and the root node 800 (855) and performs an initialization of the replica site by shipping the differences 855 to the replica site (860). In this example embodiment, determining this difference returns the entire volume device and performing an initialization based thereon triggers a full sweep (i.e., sending all the volume data form the production site to the replica site). The parent volume data node $805_1$ is now frozen. The host 820 may continue to write to the volume using the SCSI personality 815 pointing to the second volume data node $805_2$.

As replication continues periodically, the production site storage may perform a "refresh snapshot from device" operation (as described with reference to FIGS. 4A and 4B) on the second volume data node $805_2$ (865), creating a second snapshot node $810_2$ (865A) and a third volume data node $805_3$ (865B) and causing the SCSI personality 815 to be reassigned from the second volume data node $805_2$ to the third volume data node $805_3$ (865C) and the snapshot SCSI personality 825 to be reassigned from the first snapshot node $810_1$ to the second snapshot node $810_2$ (865D). The production site storage then determines the difference 870 between the second snapshot node $810_2$ and the first snapshot node $810_1$ (870). The production site storage then may delete the first snapshot node $810_1$ (875) and perform an initialization of the replica site by shipping the differences 870 to the replica site (880). The second volume data node $805_2$ connected to the root 800 will be merged automatically with the first volume data node $805_1$ (i.e., instead of having the first and second volume data nodes $805_1$, $805_2$ which individual contain the changes from their respective parent node, the changes in the second volume data node $805_2$ will be merged in the first volume data node $805_1$ and the first volume data node $805_2$ will be deleted. Replication then may continue by returning to perform further "refresh snapshot from device" operations (865).

Figure 9B:
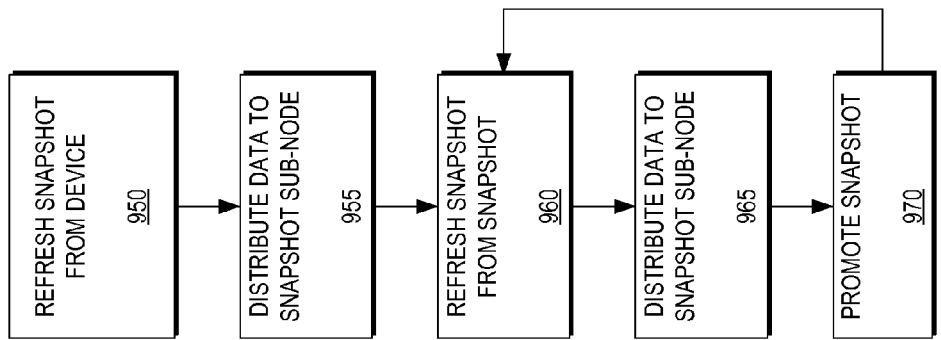
FIGS. 9A and 9B are a block diagram and a flow diagram, respectively, of a replication operation for data distribution performed at a replica site according to an example embodiment of the present invention.
Figure 9A:
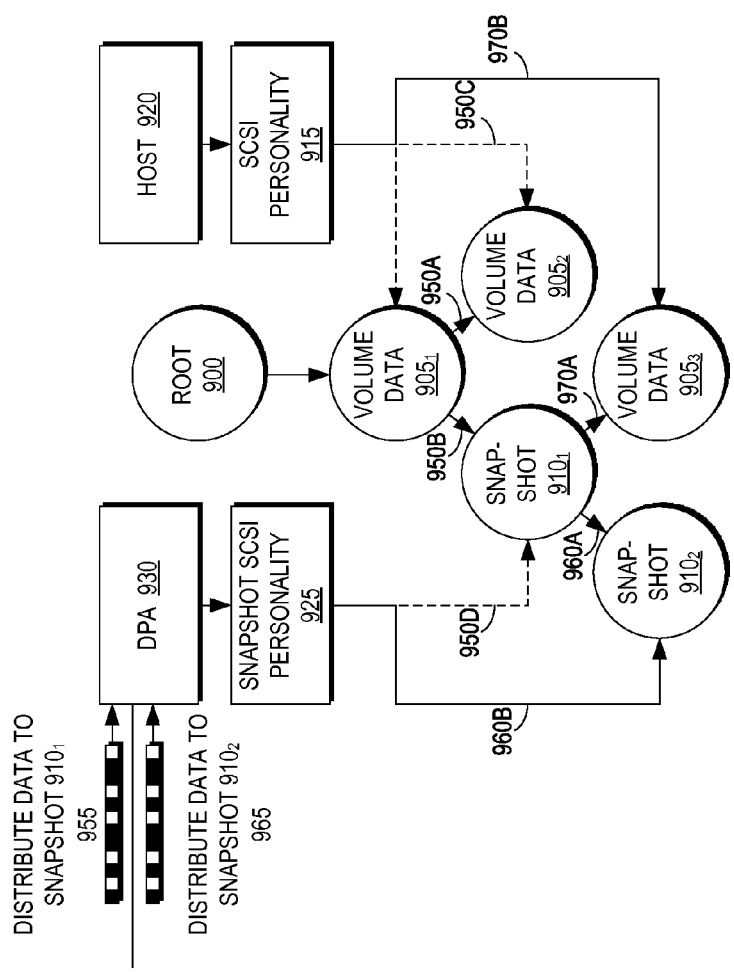

FIGS. 9A and 9B are a block diagram and a flow diagram, respectively, of a replication operation for data distribution performed at a replica site according to an example embodiment of the present invention and may be described in conjunction. As illustrated in FIG. 9A, at an initial time, the replica site may include a host 920 maintaining a SCSI personality 915 to a first volume data node $905_1$ (i.e., pointing to the volume data of a user). It should be understood that a user at the replica site may access any device, which is identified by the SCSI personality. Example embodiments of the present invention allow user access to a target device while replicating to it.

As illustrated in FIGS. 9A and 9B, when replication in the replication environment is commenced, the replica site storage may perform a "refresh snapshot from device" operation (as described above with reference to FIGS. 4A and 4B) on the first volume data node $905_1$ (950), creating a second volume data node $905_2$ (950A) (with which the host 920 may perform I/O operations) and a first snapshot node $910_1$ (950B) (to which the DPA 930 may perform replication operations) and causing the SCSI personality 915 to be reassigned from the first volume data node $905_1$ to the second volume data node $905_2$ (950C) and the snapshot SCSI personality 925 to be assigned to the first snapshot node $910_1$ (950D). The replica site also may include a DPA 930 which may distribute data 955 received from the production site to the first snapshot $910_1$ (i.e., the snapshot to which the snapshot SCSI personality 925 is pointing) (955).

Once the DPA 930 finishes writing the data for the point in time received from the production site, the replica site storage may perform a "refresh snapshot from snapshot) operation (as described above with reference to FIGS. 5A and 5B) on the first snapshot node $910_1$ (i.e., the snapshot node to which the snapshot SCSI personality 925 is pointing) (960), creating a second snapshot node $910_2$ (960A) and reassigning the snapshot SCSI personality 925 from the first snapshot node $910_1$ to the second snapshot node $910_2$ (960B). The DPA 930 then may distribute data 965 received from the production site to the second snapshot $910_2$ (965). Therefore, instead of creating a snapshot of the volume, example embodiments of the present invention create a child snapshot node of the snapshot node to which the snapshot SCSI personality 925 is pointing and then identify the child snapshot node at the current snapshot node by reassigning the snapshot SCSI personality 925.

If the host 920 wants to access a different point in time, such as the point in time represented by the first snapshot node $910_1$, the replica site storage may perform a "promote snapshot" operation (as described above with reference to FIGS. 6A and 6B) on the first snapshot node $910_1$ (970), creating a third volume data node $905_3$ (970A) as a child of the first snapshot node $910_1$ and reassigning the SCSI personality 915 from the second volume data node $905_2$ to the third volume data node $905_3$ (970B). Therefore, the SCSI personality 915 may be updated to the latest snapshot that was shipped from the production site. In other words, the host 920 connected to the volume $905_3$ may always see the latest point in time which arrived to the replica site. The process then may repeat (960).

FIGS. 10A and 10B are a block diagram and a flow diagram, respectively, of a replication operation for performing image access at the replica site according to an example embodiment of the present invention and may be described in conjunction. As illustrated in FIG. 10A, at an initial time, the replica site may include a host 1020 maintaining a SCSI personality 1015 to a second volume data node $1005_2$ as a child node of a second snapshot node $1010_2$, which also may have a third snapshot child node $1010_3$. Moving up the node tree, the second snapshot node $1010_2$ may be a child node of a first snapshot node $1010_1$ which, in turn, may be a further child node of a first volume data node $1005_1$ having a root 1000.

A user may select the first snapshot node $1010_1$ representing a point in time for performing image access (1050). The replica site storage may perform a "snapshot and reassign" operation (as described above with reference to FIGS. 6A and 6B) on the selected first snapshot node $1010_1$ creating a third volume data node $1005_3$ (1055A) and reassigning the SCSI personality 1015 from the second volume data node $1005_2$ to the third volume data node (1055B). The replica site storage then may delete the second volume data node $1005_2$ (1060) as the host 1020 is now accessing the point in time represented by the first snapshot node $1010_1$ via the newly created third volume data node $1005_3$.

Normal distribution of replica data may continue (as described above with reference to FIGS. 9A and 9B) (1065). The DPA 1030 may receive data to distribute 1065A and once the DPA 1030 completes writing the data to the third snapshot node $1010_3$, the replica site storage may perform a "refresh snapshot from snapshot" operation on the current third snapshot node $1010_3$ identified by the snapshot SCSI personality 1025 creating a fourth snapshot node $1010_4$ (1065B) and reassigning the snapshot SCSI personality 1025 from the third snapshot node $1010_3$ to the fourth snapshot node $1010_4$ (1065C). Therefore, on the replica site storage, a list of snapshots 1010 may be maintained and it should be understood that, in a preferred embodiment, every time a new snapshot is shipped from the production site a new snapshot is created on the replica site. So every time we ship a new snapshot, we create a snapshot. As illustrated in FIG. 10A, the snapshot SCSI personality 1025 points to the latest snapshot shipped. The number of snapshots retained by the replica site storage may be a configurable amount (e.g., 16 snapshots).

Further, it should be understood that, in a preferred embodiment, the main difference between image access (as described above with reference to FIGS. 10A and 10B) and regular distribution (as described above with reference to FIGS. 9A and 9B) is that the snapshot is not promoted. In other words, when the replica site is in image access mode, as long as a user requests to remain in image access mode, the user will be able to access a particular snapshot (e.g., the first snapshot node $1010_1$ as described above) and the snapshot operated on by the host 1020 is not updated. In contrast, in regular distribution, each time a snapshot is created or every time the snapshot being access is deleted, the data pointed to by the SCSI personality 1015 is updated by promoting the snapshot and creating a new volume data node for host access. It should be understood that image access mode may be exited by promoting the latest snapshot.

Figure 11B:
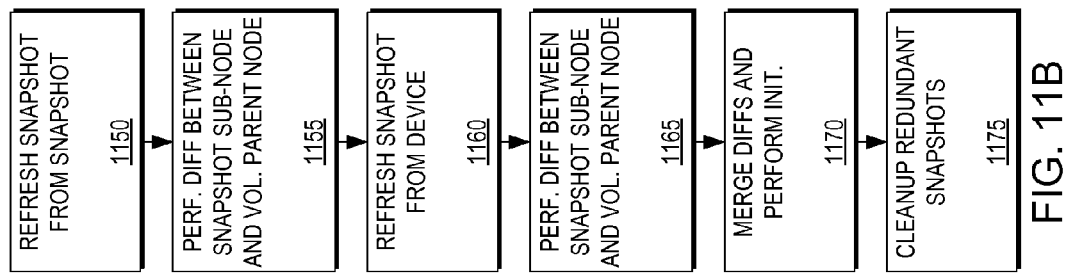
FIGS. 11A and 11B are a block diagram and a flow diagram, respectively, of a replication operation for performing failover in a replication environment according to an example embodiment of the present invention.
Figure 11A:
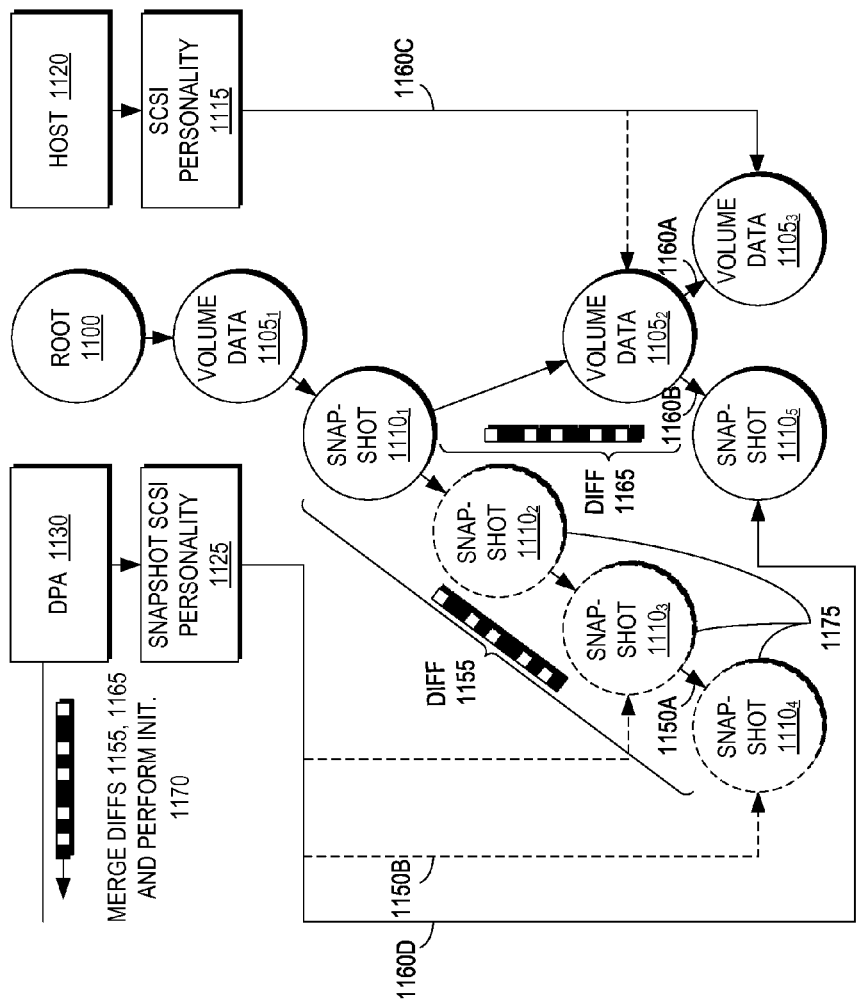

FIGS. 11A and 11B are a block diagram and a flow diagram, respectively, of a replication operation for performing failover in a replication environment according to an example embodiment of the present invention and may be described in conjunction. As illustrated in FIG. 11A, at an initial time, the replica site may include a host 1120 maintaining a SCSI personality 1115 to a second volume data node $1105_2$ (i.e., pointing to the volume data of a user) and DPA 1130 maintaining a snapshot SCSI personality 1125 pointing to a current third snapshot node $1110_3$. The second volume data node $1105_2$ and an intermediate second snapshot node $1110_2$ may be respective child nodes of a first snapshot node $1110_1$ which may, in turn, be a child node of a first volume data node $1105_1$ having a root 1100. The DPA 1130 may be performing replication by writing I/Os received from the production site to the third snapshot node $1110_3$.

In example embodiments of the present invention, to perform failover from the production site to the replica site (e.g., copy the data from the first snapshot node $1110_1$ to the production site volume), the replica site storage may perform a "refresh snapshot from snapshot" operation (1150)

(as described above with respect to FIGS. 5A and 5B) creating a fourth snapshot node $1110_4$ as a child node of the third snapshot node $1110_3$ (1150A) and causing the DPA 1130 to reassign the snapshot SCSI personality 1125 from the third snapshot node $1110_3$ to the fourth snapshot node $1110_4$ (1150B). The replica site storage then may determine the difference 1155 between the fourth snapshot node $1110_4$ and the parent node of the failover volume node (i.e., the first snapshot node $1110_1$) (1155).

The replica site storage then may perform a "refresh snapshot from device" operation (1160) (as described above with reference to FIGS. 4A and 4B) creating a third volume data node $1105_3$ (1160A) and a fifth snapshot node $1110_5$ (1160B) (representing the volume data for the point in time to be pushed back to the production site as the volume may change if the host performs I/O operations with the second volume data node $1105_2$) as respective child nodes of the second volume data node $1105_2$ and causing the SCSI personality 1115 to be reassigned from the second volume data node $1105_2$ to the third volume data node $1105_3$ (1160C) and the snapshot SCSI personality 1125 to be reassigned from the fourth snapshot node $1110_4$ to the fifth snapshot node $1110_5$ (1160D). The replica site storage then may determine the difference 1165 between the fifth snapshot node $1110_5$ and the parent node of the failover volume node (i.e., the first snapshot node $1110_1$) (1165).

The replica site storage then may merge the differences 1155, 1165 into one differences bitmap, which contains the difference between the second volume data node $1105_2$ and the fourth snapshot node $1110_4$, which is the current point in time, and perform an initialization 1170 (1170) by sending the merged differences 1155, 1165 to the production site for failover. The replica site then may be cleaned up by deleting unnecessary snapshot (1175) (e.g., second snapshot node $1110_2$, third snapshot node $1110_3$, and fourth snapshot node $1110_4$). Therefore, at the end of this process, the replica site volume is at an initial state for the production site volume (i.e., the last snapshot taken (e.g., fifth snapshot node $1110_5$) is synchronized with the new replica volume). Replication may then resume from the replica site (i.e., the new production site) to the production site (i.e., the new replica site).

Figure 12:
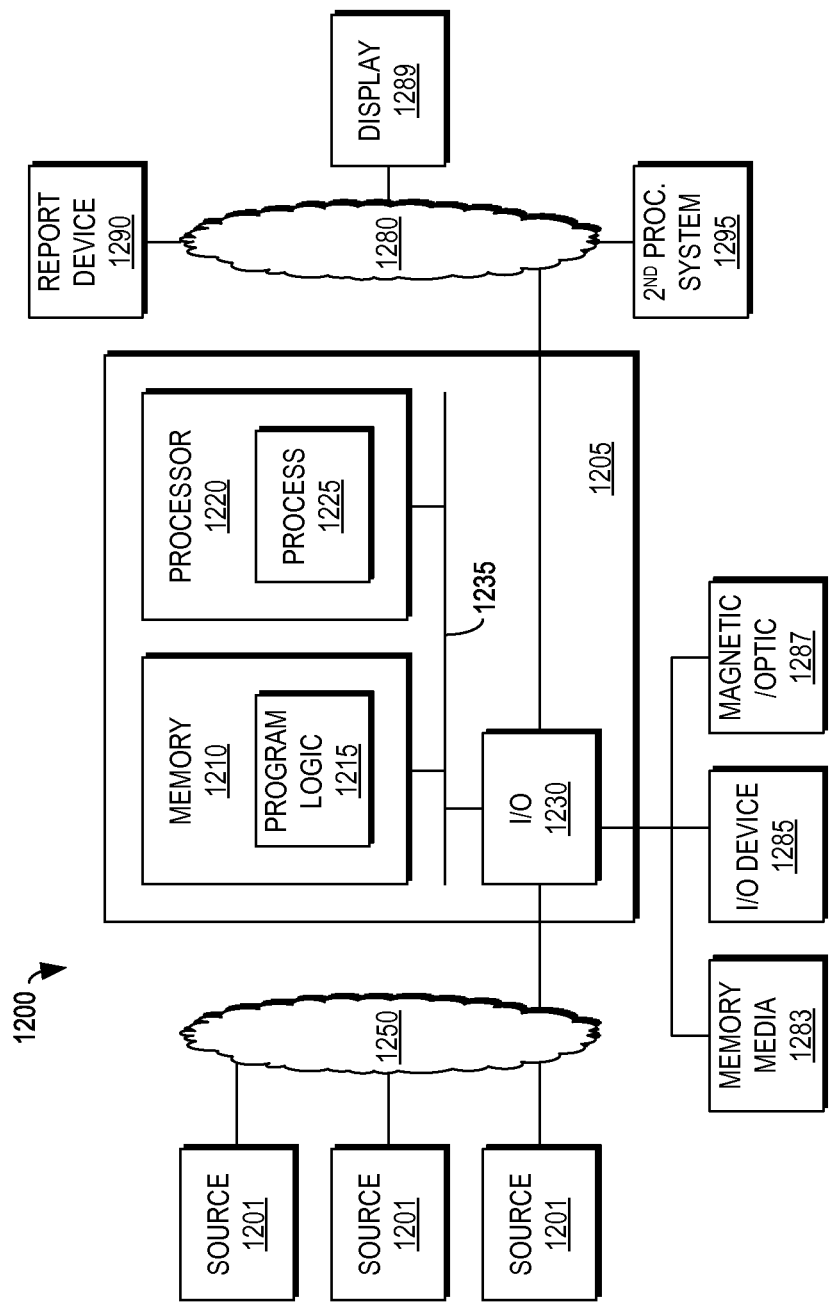
FIG. 12 is a block diagram of an apparatus according to example embodiment of the present invention.

FIG. 12 is a block diagram of an example embodiment apparatus 1205 according to the present invention. The apparatus 1205 may be part of a system 1200 and includes memory 1210 storing program logic 1215, a processor 1220 for executing a process 1225, and a communications I/O interface 1230, connected via a bus 1235.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 13:
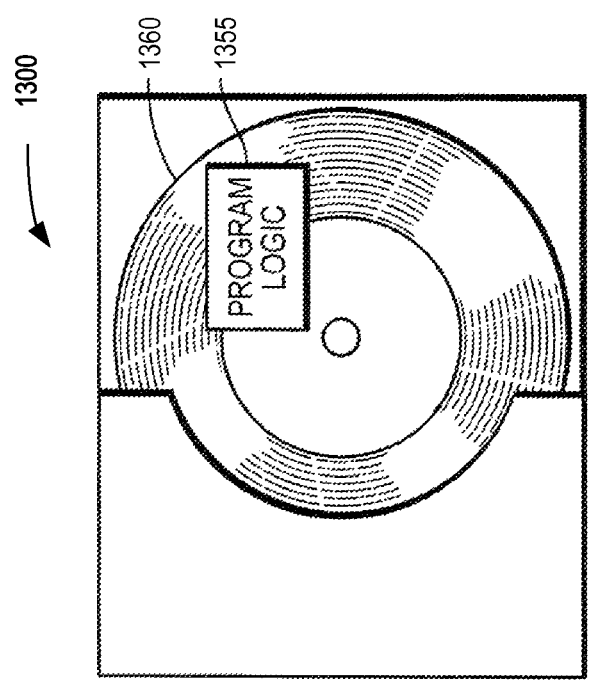
FIG. 13 is an illustration of computer program code according to an example embodiment of the present invention.

FIG. 13 shows program logic 1355 embodied on a computer-readable medium 1360 as shown, and wherein the logic 1355 is encoded in computer-executable code configured for carrying out the methods of this invention, thereby forming a computer program product 1300.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   performing data protection from a production site to a replica site in a replication environment;
   enabling concurrent host access to a volume data node at the replica site to a point in time different than a current point in time of the replication environment;
   enabling the replica site to replicate changes received from the production site, wherein enabling the replica site to replicate changes received from the production site comprises enabling data protection to be performed to a child snapshot node of a parent node of the volume data node, further wherein a replica volume at the replica site is represented as a tree of nodes;
      wherein the volume data node is assigned a SCSI personality identifying the volume data node as an access target for access by a replica site host; and
      wherein the child snapshot node of the parent node of the volume data node is assigned a snapshot SCSI personality identifying the snapshot node as a replication target for replication of I/Os from the production site;
   performing failover to the replica volume comprising:
      determining differences between the replica site and the production site;
      sending the differences to the production site for replication to a production volume; and
      performing data protection from the replica site to the production site;
         wherein determining differences between the replica site and the production site comprises:
            determining a first set of differences at the replica site resulting from data protection being performed to the snapshot node;
            determining a second set of differences at the replica site resulting from host access to the volume data node;
            merging the first set of differences and the second set of differences;
            sending the merged differences to the production site for replication to a production volume; and
         wherein the snapshot node is a first snapshot node;
         wherein the volume data node is a first volume data node;
         wherein determining a first set of differences at the replica site resulting from data protection being performed to the snapshot node comprises:

creating a second snapshot node as a child node of the first snapshot node;
reassigning the snapshot SCSI personality to the second snapshot node; and
determining the first set of differences between the second snapshot node and a parent node of the first volume data node; and
wherein determining a second set of differences at the replica site resulting from host access to the volume data node comprises:
creating a third snapshot node as a child node of the first volume data node;
creating a second volume data node as a child node of the first volume data node;
reassigning the SCSI personality to the second volume data node; and
determining the second set of differences between the third snapshot node and the parent node of the first volume data node.

2. The method of claim 1
wherein enabling host access to the volume data node comprises:
receiving a selection of a snapshot at the replica site for image access represented as a snapshot node in the tree of nodes representing the replica volume;
creating the volume data node as a child node of the snapshot node; and
reassigning the SCSI personality to the created volume data node identifying the created volume data node as the access target for access by a replica site host; and
wherein enabling data protection to be performed to a child snapshot node of a parent node of the volume data node comprises enabling data protection to continue to the snapshot node concurrent with host access to the volume data node.

3. The method of claim 2 wherein the snapshot node is a first snapshot node, the method further comprising:
creating a second snapshot node as a child node of the first snapshot node;
reassigning the snapshot SCSI personality to the second snapshot node; and
enabling data protection to the second snapshot node concurrent with host access to the volume data node.

4. The method of claim 1 further comprising:
removing the first snapshot node and its child nodes from the tree; and
reassigning the snapshot SCSI personality to the third snapshot node.

5. A system comprising:
a replication environment comprising a production site and a replica site further comprising a replication appliance and a host; and
computer program code configured to perform the operations of:
performing data protection from the production site to the replica site in the replication environment;
enabling concurrent host access to a volume data at the replica site to a point in time different than a current point in time of the replication environment;
enabling the replica site to replicate changes received from the production site, wherein enabling the replica site to replicate changes received from the production site comprises enabling data protection to be performed to a child snapshot node of a parent node of the volume data node, further wherein a replica volume at the replica site is represented as a tree of nodes;
wherein the volume data node is assigned a SCSI personality identifying the volume data node as an access target for access by a replica site host; and
wherein the child snapshot node of the parent node of the volume data node is assigned a snapshot SCSI personality identifying the snapshot node as a replication target for replication of I/Os from the production site,
performing failover to the replica volume comprising:
determining differences between the replica site and the production site;
sending the differences to the production site for replication to a production volume; and
performing data production from the replica site to the production site;
wherein determining differences between the replica site and the production site comprises:
determining a first set of differences at the replica site resulting from data protection being performed to the snapshot node;
determining a second set of differences at the replica site resulting from the host access to the volume data node;
merging the first set of differences and the second set of differences;
sending the merged differences to the production site for replication to a production volume; and
wherein the snapshot node is a first snapshot node;
wherein the volume data node is a first volume data node,
wherein determining a first set of differences at the replica site resulting from data protection being performed to the snapshot node comprises:
creating a second snapshot node as a child node of the first snapshot node;
reassigning the snapshot SCSI personality to the second snapshot node; and
determining the first set of differences between the second snapshot node and a parent node of the first volume data node; and
wherein determining a second set of differences at the replica site resulting from host access to the volume data node comprises:
creating a third snapshot node as a child node of the first volume data node;
creating a second volume data node as a child node of the first volume data node;
reassigning the SCSI personality to the second volume data node; and
determining the second set of differences between the third snapshot node and the parent node of the first volume data node.

6. The system of claim 5
wherein enabling host access to the volume data node comprises:
receiving a selection of a snapshot at the replica site for image access represented as a snapshot node in the tree of nodes representing the replica volume;
creating the volume data node as a child node of the snapshot node; and
reassigning the SCSI personality to the created volume data node identifying the created volume data node as the access target for access by a replica site host; and
wherein enabling data protection to be performed to a child snapshot node of a parent node of the volume data node comprises enabling data protection to continue to the snapshot node concurrent with host access to the volume data node.

7. The system of claim 6
wherein the snapshot node is a first snapshot node; and
wherein the computer program code is further configured to perform the operations of:
creating a second snapshot node as a child node of the first snapshot node;
reassigning the snapshot SCSI personality to the second snapshot node; and
enabling data protection to the second snapshot node concurrent with host access to the volume data node.

8. The system of claim 5 wherein the computer program code is further configured to perform the operations of:
removing the first snapshot node and its child nodes from the tree; and
reassigning the snapshot SCSI personality to the third snapshot node.

9. A computer program product including a non-transitory computer-readable storage medium having computer program code encoded thereon that when executed on a processor of a computer causes the computer to enable concurrent host access at the replica site to a point in time different than a current point in time of the replication environment, the computer program code comprising:
computer program code for performing data protection from a production site to a replica site in a replication environment;
computer program code for enabling concurrent host access to a volume data node at the replica site to a point in time different than a current point in time of the replication environment;
computer program code for enabling the replica site to replicate changes received from the production site, wherein enabling the replica site to replicate changes received from the production site comprises enabling data protection to be performed to a child snapshot node of a parent node of the volume data node, further wherein a replica volume at the replica site is represented as a tree of nodes;
wherein the volume data node is assigned a SCSI personality identifying the volume data node as an access target for access by a replica site host; and
wherein the child snapshot node of the parent node of the volume data node is assigned a snapshot SCSI personality identifying the snapshot node as a replication target for replication of I/Os from the production site;
computer program code for performing failover to the replica volume comprising:
computer program code for determining differences between the replica site and the production site;
computer program code for sending the differences to the production site for replication to a production volume; and
computer program code for performing data protection from the replica site to the production site;
wherein determining differences between the replica site and the production site comprises:
computer program code for determining a first set of differences at the replica site resulting from data protection being performed to the snapshot node;
computer program code for determining a second set of differences at the replica site resulting from host access to the volume data node;
computer program code for merging the first set of differences and the second set of differences;
computer program code for sending the merged differences to the production site for replication to a production volume; and
wherein the snapshot node is a first snapshot node;
wherein the volume data node is a first volume data node,
wherein determining a first set of differences at the replica site resulting from data protection being performed to the snapshot node comprises:
computer program code for creating a second snapshot node as a child node of the first snapshot node;
computer program code for reassigning the snapshot SCSI personality to the second snapshot node; and
computer program code for determining the first set of differences between the second snapshot node and a parent node of the first volume data node; and
wherein determining a second set of differences at the replica site resulting from host access to the volume data node comprises:
computer program code for creating a third snapshot node as a child node of the first volume data node;
computer program code for creating a second volume data node as a child node of the first volume data node;
computer program code for reassigning the SCSI personality to the second volume data node; and
computer program code for determining the second set of differences between the third snapshot node and the parent node of the first volume data node.

10. The computer program product of claim 9
wherein enabling host access to a volume data node comprises:
computer program code for receiving a selection of a snapshot at the replica site for image access represented as a snapshot node in the tree of nodes representing the replica volume;
computer program code for creating the volume data node as a child node of the snapshot node; and
computer program code for reassigning the SCSI personality to the created volume data node identifying the created volume data node as the access target for access by a replica site host; and
wherein enabling data protection to be performed to a child snapshot node of a parent node of the volume data node comprises computer program code for enabling data protection to continue to the snapshot node concurrent with host access to the volume data node.

11. The computer program product of claim 10 wherein the snapshot node is a first snapshot node, the system further comprising:
computer program code for creating a second snapshot node as a child node of the first snapshot node;
computer program code for reassigning the snapshot SCSI personality to the second snapshot node; and
computer program code for enabling data protection to the second snapshot node concurrent with host access to the volume data node.

* * * * *